(12) United States Patent
Radosav

(10) Patent No.: US 10,702,091 B2
(45) Date of Patent: Jul. 7, 2020

(54) INFUSION BREWER AND CLOSED LOOP FILTER THEREOF

(71) Applicant: Aleksandar Radosav, St. Albert (CA)

(72) Inventor: Aleksandar Radosav, St. Albert (CA)

( * ) Notice: Subject to any disclaimer, the term of this patent is extended or adjusted under 35 U.S.C. 154(b) by 528 days.

(21) Appl. No.: 15/119,875

(22) PCT Filed: Feb. 17, 2015

(86) PCT No.: PCT/CA2015/050113
§ 371 (c)(1),
(2) Date: Aug. 18, 2016

(87) PCT Pub. No.: WO2015/123766
PCT Pub. Date: Aug. 27, 2015

(65) Prior Publication Data
US 2017/0055759 A1    Mar. 2, 2017

Related U.S. Application Data

(60) Provisional application No. 61/941,661, filed on Feb. 19, 2014.

(51) Int. Cl.
*A47J 31/06* (2006.01)
*A47J 31/10* (2006.01)
*A47J 31/24* (2006.01)

(52) U.S. Cl.
CPC ............ *A47J 31/10* (2013.01); *A47J 31/06* (2013.01); *A47J 31/24* (2013.01)

(58) Field of Classification Search
CPC .. A47J 31/3633; A47J 31/3642; A47J 31/407; A47J 31/3647–3652; A47J 31/06; A47J 31/10; A47J 31/24; A47J 31/3652; A47J 31/3657; A47J 31/3661; A47J 31/408; B65D 85/8043; B65G 59/06
USPC ............ 414/797.4; 99/289 R, 283, 323, 279, 99/295, 281, 288, 297, 299, 316, 317, 99/289 T; 426/431–435, 77–84
See application file for complete search history.

(56) References Cited

U.S. PATENT DOCUMENTS

| | | | | |
|---|---|---|---|---|
| 3,244,287 A | * | 4/1966 | Staunton | G01N 1/4077 210/387 |
| 3,306,183 A | | 2/1967 | Richeson | |
| 4,134,332 A | * | 1/1979 | Merman | A47J 31/408 210/400 |
| 4,159,947 A | * | 7/1979 | Brooks | B01D 33/042 100/112 |

(Continued)

OTHER PUBLICATIONS

International Search Report and Written Opinion for International Application No. PCT/CA2015/050113, dated May 7, 2015 (7 pages).

(Continued)

*Primary Examiner* — Tu B Hoang
*Assistant Examiner* — Tiffany T Tran
(74) *Attorney, Agent, or Firm* — Eversheds Sutherland (US) LLP

(57) ABSTRACT

The infusion brewer has a filter path forming a continuous loop around a plurality of rotary shafts, the plurality of rotary shafts being operable to cycle a continuous loop filter along the filter path, the filter path having a steeping area; and an infusion enclosure having a bottom opening positionable into an infusion position against the continuous loop filter at the steeping area.

10 Claims, 2 Drawing Sheets

(56) References Cited

U.S. PATENT DOCUMENTS

| | | | |
|---|---|---|---|
| 4,506,596 A | | 3/1985 | Hiromichi et al. |
| 4,928,584 A | * | 5/1990 | Young ............... A47J 31/60 |
| | | | 99/289 T |
| 5,021,166 A | * | 6/1991 | Torpey ............. B01D 33/042 |
| | | | 210/709 |
| 5,221,472 A | * | 6/1993 | Ikeda ............... B01D 29/09 |
| | | | 210/389 |
| 5,349,897 A | | 9/1994 | King et al. |
| 5,351,604 A | | 10/1994 | King et al. |
| 5,473,977 A | * | 12/1995 | Koether ............ A47J 37/042 |
| | | | 29/401.1 |
| 5,697,288 A | * | 12/1997 | King ................. A47J 31/408 |
| | | | 99/289 T |
| 6,174,446 B1 | * | 1/2001 | Andresen .......... B01D 29/096 |
| | | | 210/744 |
| 7,858,135 B2 | | 12/2010 | Radosav |
| 2008/0017042 A1 | | 1/2008 | Almblad et al. |
| 2008/0038423 A1 | * | 2/2008 | Klant ............... A47J 31/3652 |
| | | | 426/431 |
| 2010/0278988 A1 | * | 11/2010 | Radosav ............ A47J 31/18 |
| | | | 426/433 |
| 2011/0129581 A1 | | 6/2011 | Overton et al. |

OTHER PUBLICATIONS

Extended European Search Report issued in EP Application No. 15752110, dated Nov. 7, 2017, 13 pages.

\* cited by examiner

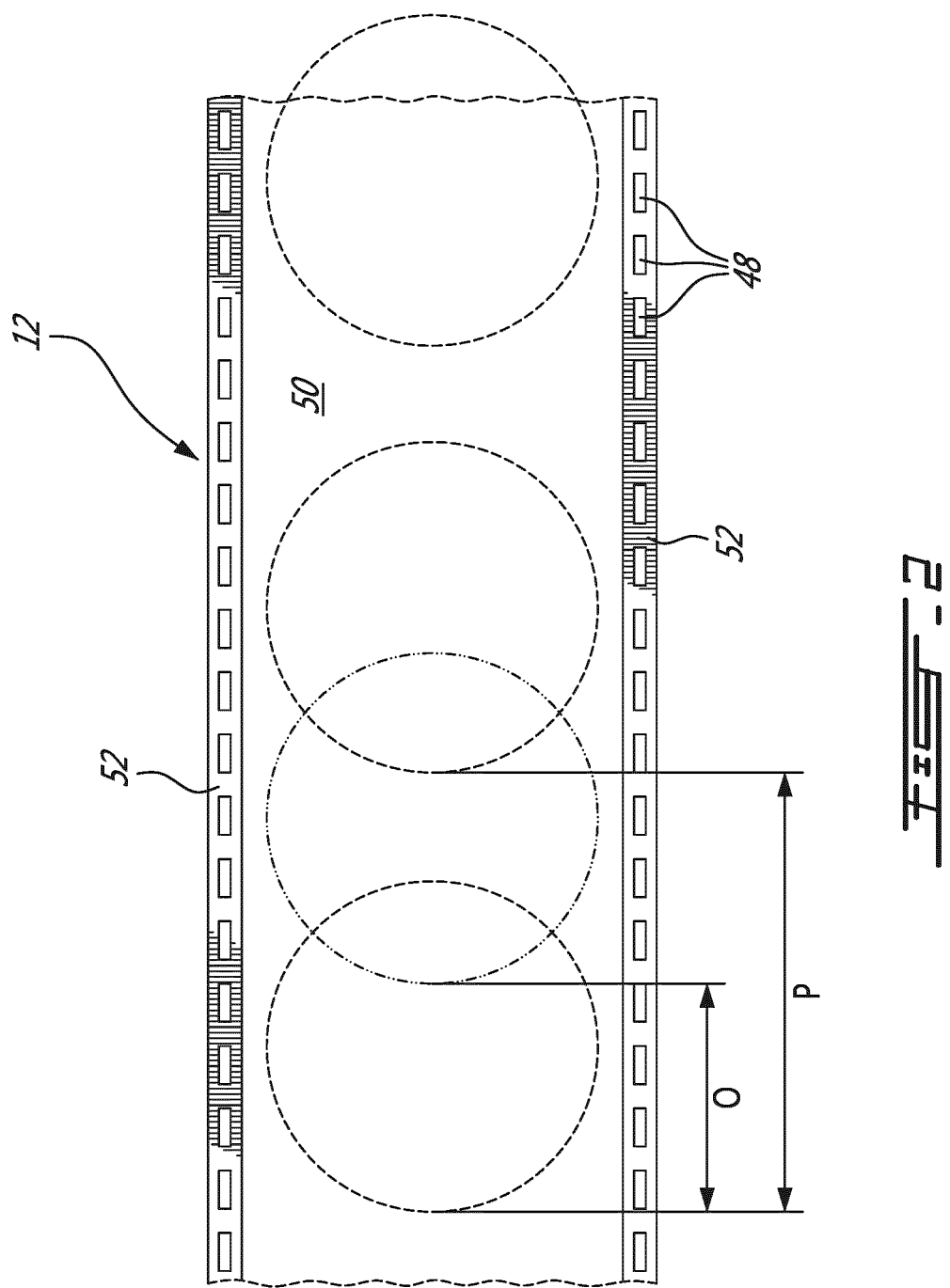

INFUSION BREWER AND CLOSED LOOP FILTER THEREOF

CROSS-REFERENCE TO RELATED APPLICATIONS

This application is a national stage application filing of International Patent Application No. PCT/CA2015/050113, filed Feb. 17, 2015, which claims priority from U.S. Provisional Patent Application No. 61/941,661, filed Feb. 19, 2014, the contents of each of which are hereby incorporated herein by reference for all purposes.

FIELD

The improvements generally relate to the field of automatic filter-based infusion brewers.

BACKGROUND

Many types infusion brewers are commonly used nowadays and can typically brew coffee or other brewable beverages such as tea or the like and are often referred to as 'coffee machines' or 'coffee brewers' independently of the type of beverage they are actually used to brew. Filter-based coffee machines use a filter to separate coffee grinds from the coffee-infused water. In many filter-based coffee machines, a given amount of water is infused with a given amount of coffee until the infused water seeps through the filter under the action of gravity. In household filter-based coffee machines, it is known to discard the filter manually after the brewing process is completed, or washing the filter by hand in the case of re-usable filters.

Some more elaborated automated filter coffee machines allow users to brew many portions of coffee prior to manual intervention, and are well adapted to applications serving multiple users. An example of this is shown in U.S. Pat. No. 7,858,135 to applicant. In this particular case, the brewer uses a vacuum to assist gravity in bringing the infused water across the filter, and uses a roll of filter paper which is progressively unrolled to present fresh paper to subsequent brewing steps. More specifically, an upper chamber is provided for receiving particulate steeping material (coffee, tea, or other) and hot liquid water, a lower chamber for providing a vacuum, with the filter path extending therebetween. During operation, the lower chamber can draw the infusion from the upper chamber across the filter and thus produce coffee which can be conveyed to a suitable vessel. Once a given amount of coffee is produced, the upper chamber can be raised away from the lower chamber, and the strip of filter material from the roll can be pulled to unroll fresh filter material. The used coffee grinds which lay on top of the used portion of the filter are moved with the filter strip and fall into a waste container which needs to be emptied after a while. It will be understood that the amount of portions of coffee which are brewable between manual interventions when using such a machine, though greater than with household single-use filters, is nonetheless limited by the size of the filter paper rolls and of the size of the coffee grind waste container.

Although known coffee brewers were satisfactory to a certain degree, there remained room for improvement. For instance, it was sought to still further address the frequency of human maintenance intervention or other aspects pertaining generally to maintenance.

SUMMARY

In accordance with one aspect, there is provided an infusion brewer comprising: a filter path forming a continuous loop around a plurality of rotary shafts, the plurality of rotary shafts being operable to cycle a continuous loop filter along the filter path, the filter path having a steeping area; and an infusion enclosure having a bottom opening positionable into an infusion position against the continuous loop filter at the steeping area.

In accordance with another aspect, there is provided a method of producing a plurality of infusion portions, the method comprising: providing particulate matter and fluid at a steeping area; steeping the particulate matter and fluid into one of the infusion portions; separating the corresponding infusion portion from used particulate matter across a closed loop filter; cycling the closed loop filter along a portion of its length to feed a free portion of the closed loop filter to the steeping area, and freeing a used portion of the closed loop filter from used particulate matter; and repeating the sequence of steps of providing, steeping, processing, and cycling and freeing to produce the plurality of portions of the infusion.

In accordance with another aspect, there is provided a closed loop filter for an infusion brewer, the closed loop filter having a closed loop band of sheet-like filtration material having a porosity adapted to separating the infusion from used particulate material across it.

Many further features and combinations thereof concerning the present improvements will appear to those skilled in the art following a reading of the instant disclosure.

DESCRIPTION OF THE FIGURES

In the figures,

FIG. 2 is a top plan view of a portion of the closed loop filter.

DETAILED DESCRIPTION

Figure 1:
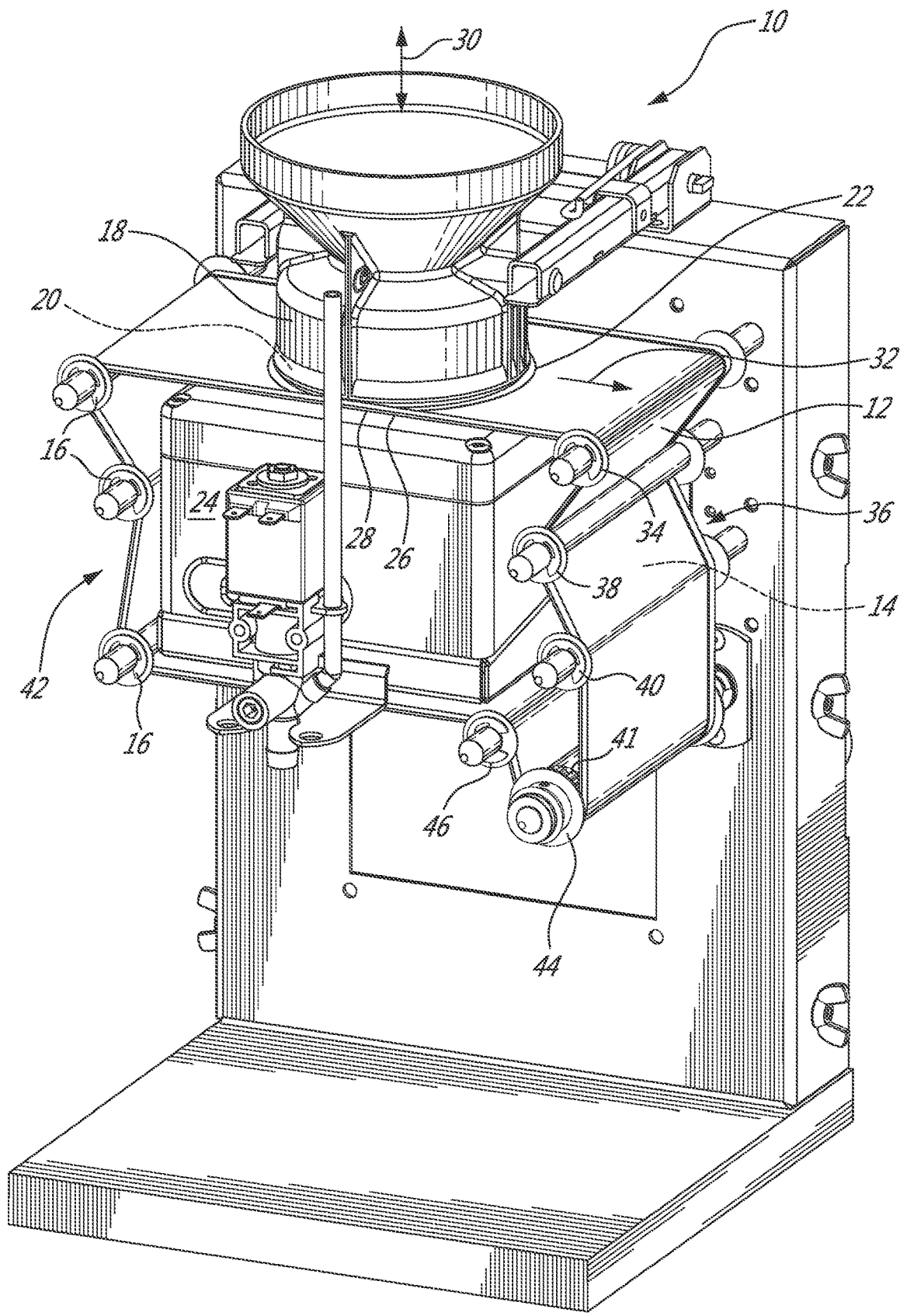
FIG. 1 is a frontal schematic view of an example of an infusion brewer with a closed loop filter.

FIG. 1 shows an example of an infusion brewer 10 which incorporates a re-usable filter 12 (which can alternately be referred to as a permanent filter) in a closed loop configuration. As presented below, this configuration can allow reducing the maintenance burden associated with manual intervention requirements when producing a plurality of infusion portions. It will be noted here that in the example presented below, the infusion brewer 10 is a vacuum brewer, but it will be understood that the closed-loop configuration described herein can be used with other infusion brewers in alternate embodiments.

The closed loop filter can be seen to occupy a filter path 14 which has the closed loop configuration, travelling like a web around a plurality of rotary shafts 16 which are positioned at specific locations and which can be operated to cycle the closed loop filter along its closed-loop length.

During operation, the particulate matter (e.g. coffee grinds, tea, or another matter from which the infusion is to be prepared) is mixed with liquid (typically hot water) in an infusion enclosure 18 which is positioned immediately above a steeping area 20 of the filter path 14, which can be automated using known techniques. More specifically, in this embodiment, the infusion enclosure 18 has a lower face 22 surrounding a bottom opening and which is placed in sealing abutment against the closed loop filter 12 during the steeping of the particulate matter with the hot water. During the steeping, the aromas are extracted from the particulate matter, which creates the infusion portion. The infusion portion is then separated from the used particulate matter by travelling across the closed loop filter 12, while the used particulate matter remains on top of the filter. In some alternate embodiments, the processing of the infusion portion across the filter can be done by gravity. In this particular example, it is assisted by a differential pressure generated between the area above the filter and the area below the filter. More specifically, a vacuum chamber 24 is provided below the filter and has a filter support 26 surrounding an infusion aperture 28 at its upper portion. The filter support 26 can form a seal by abutment against the lower face 22 of the infusion enclosure, between which the closed loop filter 12 is sandwiched. The pressure can be lowered in the vacuum chamber using known techniques while, in this embodiment, the infusion chamber remains at atmospheric pressure. The lower pressure in the vacuum chamber 24 contributes to draw the infusion across the closed loop filter 12 and into the vacuum chamber 24 across the infusion aperture 28, from where it can be conveyed to a suitable vessel, in this example embodiment.

The continuous loop filter 12 has a porous filter material across which the infusion is drawn and which has limited mechanical resistance. To this end, it can be preferred to support it from below during the production of the infusion portion. In this embodiment, this filter support role is played by a mesh provided as the infusion aperture which provides some structural resistance to support the filter material while allowing the infusion to freely circulate thereacross. It will be understood, however, that in alternate embodiments, the filter support can take a different form, or perhaps even be entirely omitted, should the structural resistance of the closed loop filter be sufficient to avoid this element in some embodiments. For instance, the filter support can be omitted in an embodiment which does not have a vacuum chamber.

Once an infusion portion has been produced with the illustrated embodiment, the infusion brewer 10 is readied to produce a subsequent infusion portion by firstly moving the infusion enclosure 18 away from the closed-loop filter 12 and from the vacuum chamber 24, to free a path for the used particulate matter. Such a movement is illustrated by arrows 30. The closed-loop filter 12 is then cycled along a portion of its length, as shown by arrow 32, and acts as a conveyor to carry the used particulate matter away from the steeping area 20. In this embodiment, for instance, it can be carried around a corner edge 34 of the filter path, formed by an outer radius of a corresponding one of the rotary shafts, where the used particulate matter can fall off, either by itself or by assistance of a scraper, and be conveyed to a waste receptacle (not shown) under the assistance of gravity, for instance. By the same cycling action, a clean portion of the closed-loop filter is brought into the steeping area 20 of the filter path 14, and the subsequent infusion portion can be brewed.

In this embodiment, a controller (not shown) is made integral to the infusion brewing device and controls all the steps of the brewing process automatically once a brewing command is received via a user interface. These steps can include delivering the particulate matter, delivering the hot water, waiting a given period of time, activating the vacuum pump to draw the infusion portion across the filter, activating a valve to deliver the infusion portion to a user vessel, raising infusion enclosure, moving the closed-loop filter along a portion of its closed-loop length and lowering the infusion enclosure to sandwich the closed-loop filter with the filter support to form a seal therewith.

It will be understood at this stage that upon producing a sufficient amount of infusion portions, a previously used portion of the closed-loop filter will eventually reach the steeping area 20 and be re-used to produce another infusion portion. For this to function properly, and for a satisfactory amount of times, corresponding portions of the closed loop filter are cleaned as they are cycled around the filter path between subsequent uses.

In this particular embodiment, a first cleaning step occurs when the particulate matter reaches the corner edge of the filter path and is moved therearound, as at least most of it can be removed from the filter material at that point. However, the porous filtration material of the closed-loop filter can still contain some particulate matter, especially small particles thereof, which can be mixed together with humidity.

It was found that processing the used portion of the closed-loop filter across a chicane portion 36 of the filter path 14 could significantly clean the porous filtration material from such particulate matter and humidity remnants. More specifically, the chicane portion 36 in FIG. 1 can be seen to include a sequence of a first outer radius corresponding to the corner edge 34, an inner radius 38, and a second outer radius 40 which successively folds the porous filtration material outwardly, inwardly, and outwardly again. In one or more of the folds, the porous filtration material can be wrapped around a significant portion of the circumference of corresponding rollers provided as part of associated ones of the rotary shafts, such as above 25% of the circumference of the rollers, for instance. The angles can be selected to form a laterally-oriented V-shape such as illustrated.

In this particular embodiment, the cleaning effect of the chicane portion 36 is doubled by providing a second chicane portion 42 on the other lateral side of the filter path 14. This successions of two chicane portions can be found to satisfactorily clean the used portions of the closed-loop filter from particulate matter and humidity residues for a cleaned portion of the closed-loop filter to be presented at the steeping area 20 after a complete cycling following the production of an infusion portion.

Moreover, one or more additional cleaning devices, such as a brush, wiper, vacuum cleaner type device or another mechanism for cleaning and removing fine particles can be provided along the filter path to provide still additional cleaning. Since this specific embodiment already used a vacuum pump to create the vacuum in the vacuum chamber, it was decided to connect an aspiration conduit to this vacuum pump and provide the inlet of this aspiration conduit onto the closed-loop filter for aspiration to further assist in the cleaning effect. In this embodiment, it was decided to position a cleaning mechanism between the two chicane portions.

In this embodiment, several or all of the rotary shafts are linked to one another so as to rotate collectively. The closed-loop filter is tightly wrapped around the rotary shafts to provide for a satisfactory frictional engagement therebetween in a manner that rotation of the shafts is automatically transferred over to cycle the closed-loop filter. In this embodiment, a displaceable tightener shaft is used to adjust the tension in the closed-loop filter. In an alternate embodiment, one or more of the shafts can have gear teeth which are engaged with corresponding holes in the closed-loop filter, for instance.

Referring now to FIG. 2, it will be understood that the infusion brewer can be automated in a manner to cycle a given length P of the closed-loop filter between brewings. It will now be further understood that the given length P can be selected as a function of the total closed-loop length of the closed-loop filter in order for infusing areas of a second closed-loop cycle to be offset by an offset distance O from the infusing areas of the first closed-loop cycle in order to favour a greater use of the surface of the closed-loop filter over cycle pairs and increase the cleaning effect of the chicane portions on the central portion of the infusing areas of the closed-loop filter. In the example shown in FIG. 2.

Returning now back to FIG. 1, it will be understood that many forms and configurations of rotary shafts can be used to contribute to the shape/configuration of the filter path and/or to allow the driving of the closed loop filter cycling movement along the filter path in alternate embodiments. In one embodiment, simple idle rollers were found suitable to provide the shape of the chicane portions, and a separate, driving shaft, was used to provide the cycling movement. The driving shaft can be provided with a friction feature to provide a satisfactory friction between it and the closed loop filter. The friction feature can be a rubberized or ribbed texture for instance. In one embodiment, it was decided to use a gear shaped design on the driving shaft and to design the closed loop filter with corresponding apertures 48 (schematized in FIG. 2) which engage the driving gear for additional traction. The illustrated embodiment shows that the rows of apertures can be provided along the two opposite transversal edges of the filter for instance, and the driving shaft can have two associated geared wheels 41 or sprockets each designed to engage and drive a corresponding one of the rows of apertures, for instance. In this specific embodiment, both transversal edges 52 of the closed-loop filter are coated with a flexible and resistant coating such as silicone or other rubberized material for instance, to provide additional durability over successive cyclings of the closed-loop filter against the geared wheels.

It will be understood that the closed-loop filter has a web 50 of sheet-like filtration material which is provided in the form of a closed-loop band. The filtration material is selected as a function of expected durability and filtration efficiency. Depending on the applications, it can have a porosity between 5 and 200 microns, preferably between 10 and 100 microns, more preferably above 30 microns, for instance, and be made of natural cellulose, polymers, polyester, nylon, silk, steel or other materials.

As can be understood, the examples described above and illustrated are intended to be exemplary only. For instance, this specific embodiment only uses a single driving shaft in order to allow using a single motor and thus avoid potential costs and maintenance which could be associated to more than one motor, although it will be understood that multiple motors can be used in alternate embodiments. In alternate embodiments where a single motor is used, two or more of the rotary shafts can be geared to one another to allow collective operation thereof using a single motor. In alternate embodiments, the rotary shafts can be continuous transversally across the closed loop filter or not, can have gears or wheels, or be provided in the form of rollers, and the exact configuration and number thereof can depart from the configuration and number used in the illustrated embodiments, as can depart the particular shape and configuration of the closed-loop filter path. The scope is indicated by the appended claims.

What is claimed is:

1. An infusion brewer comprising:
    a filter path forming a continuous loop around a plurality of rotary shafts, the plurality of rotary shafts being operable to cycle a continuous loop filter along the filter path, the filter path having a steeping area and surrounding a vacuum chamber;
    an infusion enclosure having a bottom opening positionable into an infusion position against the continuous loop filter at the steeping area; and
    a filter support having an infusion aperture at the steeping area, wherein the filter support is provided in the form of an upper wall of the vacuum chamber;
    wherein, in the infusion position, the continuous loop filter is sandwiched between the infusion enclosure and a portion of the filter support surrounding the infusion aperture,
    wherein the filter path has a corner edge around a corresponding one of the rotary shafts following the steeping area, the corner edge leading to a first chicane portion formed with at least two further ones of the rotary shafts in a sequence of an outer radius, an inner radius, and a second outer radius;
    wherein the filter path further has a second chicane portion around at least three corresponding ones of the rotary shafts following the first chicane portion,
    wherein the first chicane portion and the second chicane portion form opposite laterally-opened V-shapes, and
    wherein a driving one of the rotary shafts is engaged internally with the filter path between the first chicane portion and the second chicane portion.

2. The infusion brewer of claim 1 wherein the driving one of the rotary shafts is engaged with the continuous loop filter.

3. The infusion brewer of claim 1 wherein the driving one of the rotary shafts has a gear wheel engaged with mating apertures in the continuous loop filter.

4. The infusion brewer of claim 3 wherein the driving one of the rotary shafts has two gear wheels, one on each opposite longitudinal end thereof.

5. The infusion brewer of claim 1 wherein the filter path surrounds the infusion aperture.

6. The infusion brewer of claim 1 wherein at least two of the rotary shafts of the first chicane portion have a roller which is wrapped by the filter path around more than a quarter of its circumference.

7. The infusion brewer of claim 1 further comprising a controller for controlling admission of particulate matter and hot water into the infusion enclosure in the infusion position, for the particulate matter to be steeped with hot water into an infusion in the infusion enclosure and the infusion to be subsequently separated from used particulate matter across a corresponding portion of the continuous loop filter and the infusion aperture, and controlling the cycling of the continuous loop filter along a portion of the continuous loop filter subsequently to said processing.

8. The infusion brewer of claim 7 wherein the controller further controls the movement of said infusion enclosure away from the filter support subsequently from said steeping and prior to said cycling, to allow evacuation of used particulate material from the steeping area.

9. The infusion brewer of claim 1 wherein the continuous loop filter has at least one row of apertures regularly interspaced from one another along an edge thereof.

10. The infusion brewer of claim 1 wherein the continuous loop filter has a coating along an edge thereof.

* * * * *